US010731519B2

(12) United States Patent
Choi (10) Patent No.: US 10,731,519 B2
(45) Date of Patent: Aug. 4, 2020

(54) CONTROL SYSTEM AND CONTROL METHOD FOR HYDRAULIC VARIABLE VALVE

(71) Applicants: Hyundai Motor Company, Seoul (KR); KIA Motors Corporation, Seoul (KR)

(72) Inventor: Myung Sik Choi, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 7 days.

(21) Appl. No.: 16/135,536

(22) Filed: Sep. 19, 2018

(65) Prior Publication Data
US 2020/0088072 A1    Mar. 19, 2020

(51) Int. Cl.
F01L 1/24 (2006.01)
F01L 1/344 (2006.01)
F02D 13/02 (2006.01)
F01L 13/00 (2006.01)
F01L 1/14 (2006.01)
F01L 1/18 (2006.01)
F02D 41/00 (2006.01)

(52) U.S. Cl.
CPC .................. F01L 1/24 (2013.01); F01L 1/14 (2013.01); F01L 1/185 (2013.01); F01L 1/2405 (2013.01); F01L 1/3442 (2013.01); F01L 13/0005 (2013.01); F02D 13/0203 (2013.01); F02D 13/0261 (2013.01); F01L 2001/3443 (2013.01); F01L 2800/00 (2013.01); F02D 2041/001 (2013.01)

(58) Field of Classification Search
CPC ............. F02D 13/0203; F02D 13/0261; F02D 2041/001; F01L 1/3442; F01L 2001/3443; F01L 2800/00; F01L 1/24; F01L 13/0005; F01L 13/0036; F01L 1/14; F01L 1/181; F01L 1/185; F01L 1/2405; F01L 2105/00; F01L 13/06; F01L 2001/0537; F01L 2001/34433
USPC ......... 123/90.16, 90.84, 90.55, 90.12, 90.43, 123/90.46
See application file for complete search history.

(56) References Cited

U.S. PATENT DOCUMENTS 5,732,612 A * 3/1998 Schienle ............. F01L 13/0036
137/596.2
2004/0244751 A1* 12/2004 Falkowski ............. F01L 1/146
123/90.55

(Continued)

FOREIGN PATENT DOCUMENTS

KR    10041120 B1    12/2003

*Primary Examiner* — Patrick Hamo
*Assistant Examiner* — Wesley G Harris
(74) *Attorney, Agent, or Firm* — Brinks Gilson & Lione (57) ABSTRACT

A control system for a hydraulic variable valve. The control system may include an OCV configured with a housing, a flow passage defined in the housing, a main port, first and second drain ports, a spool, and a relief valve; a main line connecting the main port and the oil pump to each other; a control line connecting the control port and the lash adjuster to each other; an orifice provided between the main line and the control line; and a controller controlling the OCV to allow at least one combination of the main port and the first drain port, the control port and the second drain port, and the main port and the control port to communicate with each other.

18 Claims, 6 Drawing Sheets

(56) References Cited

U.S. PATENT DOCUMENTS

2008/0035085 A1* 2/2008 Hendriksma ....... F01L 13/0005
                                                  123/90.16
2016/0319707 A1* 11/2016 Nishimoto .............. F01L 1/185

* cited by examiner

| mode | operation | oil pressure @main line | main line → Drain1 | main line → control line | control line → Drain2 | spool position | electric @ OCV |
|---|---|---|---|---|---|---|---|
| 1 | Non CDA | low pressure | opened | closed | closed (opened) | highest point | OFF |
| 2 | Non CDA | high pressure | closed | closed | closed (opened) | middle | middle_ON (position control) |
| 3 | CDA | high pressure | closed | opened | closed | lowest point | maximum_ON |

[Fig.6]

CONTROL SYSTEM AND CONTROL METHOD FOR HYDRAULIC VARIABLE VALVE

FIELD

The present disclosure relates to a control system and a control method for a hydraulic variable valve.

The statements in this section merely provide background information related to the present disclosure and may not constitute prior art.

An internal combustion engine is an engine which generates power by receiving fuel and air from outside of the engine and burning the same in a combustion chamber. The internal combustion engine typically has an intake valve through which the fuel and air are drawn into the combustion chamber and an exhaust valve through which combustion gas is discharged from the combustion chamber, wherein the intake and exhaust valves are configured to be opened and closed by rotation of a camshaft rotating in conjunction with rotation of a crankshaft.

In order to increase efficiency of the engine, the timing of opening and closing of the valves may be varied depending on level of engine RPM and level of engine load, according to vehicle's running conditions.

The timing of opening and closing of the intake valve may affect filling efficiency, such that when the intake valve is opened in advance, a valve overlap period increases. Accordingly, at a high engine speed, inertia of intake and exhaust flow can be sufficiently used, resulting in an increase in volumetric efficiency, whereas at a low engine speed, the amount of residual gas increases, resulting in a decrease in the volumetric efficiency and an increase in hydrocarbon (HC) emissions.

A technology of controlling appropriate valve timing depending on engine's driving conditions has been developed and applied whereby the valve overlap period of the camshaft is not determined in accordance with rotation of the crankshaft but has a preset displacement angle, which is referred to as a continuously variable valve timing (CWT) system.

The CWT system is a system for continuously varying the timing of opening and closing of the intake and exhaust valves by changing rotational phases of the intake and exhaust camshafts depending on the engine RPM and a vehicle's load state, that is, the system for varying valve overlap, and the purpose thereof is to reduce exhaust gas, improve performance, and stabilize idling.

Herein, valve timing is the timing of opening or closing of the intake valve and the exhaust valve. An intake process is a process in which a fresh air-fuel mixture is forced to be drawn in until the intake valve is opened and closed, and an exhaust process is a process in which combustion gas is forced to be discharged until the exhaust valve is opened and closed. The timing of opening and closing of the valves typically affects performance of the engine.

Furthermore, the valve overlap is the period that both the intake and exhaust valves are open at the same time. In the case of a typical engine, once the valve overlap is set, the set valve overlap is constantly used in the entire engine speed zone, which we have discovered may be disadvantageous in low speed or high engine speed zones.

Thus, controlling of the valve overlap according to the engine load may result in an increase in engine output, and controlling of the valve overlap according to the engine load in this manner is the CWT system.

Components of the CWT system may include a continuously variable valve timing unit, an oil control valve (OCV) that is an oil supply device, an oil temperature sensor (OTS), an oil control valve filter, an oil passage, an auto tensioner, etc. The continuously variable valve timing unit may be mounted on the exhaust camshaft and may be configured such that a housing and a rotor are provided therein and an advancing chamber and a retarding chamber are provided between the housing and a rotor vane, wherein engine oil flows in through the OCV such that the rotor vane is moved.

Furthermore, the OCV is a component of the CCVT system and serves to control the timing of opening and closing of the valves by altering a direction in a fluid path of engine oil, which is supplied from an oil pump and flows to the camshaft, under control of an engine control unit (ECU).

Engine oil, which is a working fluid of the continuous variable valve timing unit, is changed in density depending on the temperature, so that the OTS serves as a sensor that compensates for an amount of change in density depending on the temperature. The OTS measures the temperature of engine oil and transmits the measured temperature to the ECU before engine oil flows in the OCV, and the ECU drives the OCV for correction.

The oil control valve filter serves to filter impurities out of engine oil flowing to the OCV, and the auto tensioner is a tension adjusting device for a chain that connects a sprocket of the exhaust camshaft where the CWT is installed and a sprocket of the intake camshaft to each other. The auto tensioner inhibits delay or deviation of responsiveness from occurring in the CWT system to thereby provide stability of performance.

We have discovered and disclose an OCV that controls oil pressure to be adjusted for running conditions while realizing a cylinder deactivation (CDA) function has not been proposed in the related art.

The foregoing is intended merely to aid in the understanding of the background of the present disclosure, and is not intended to mean that the present disclosure falls within the purview of the related art that is already known to those skilled in the art.

SUMMARY

Further areas of applicability will become apparent from the description provided herein. It should be understood that the description and specific examples are intended for purposes of illustration only and are not intended to limit the scope of the present disclosure.

In one aspect, the present disclosure provides a control system and control method for a hydraulic variable valve, wherein engine oil pressure is controlled to be adjusted for running conditions of a vehicle while realizing the CDA function by using a single OCV.

According to one aspect of the present disclosure, there is provided a control system for a hydraulic variable valve, the control system including: an OCV configured with a housing having a flow passage defined therein, a main port provided on an outer circumferential surface of the housing and allowing the flow passage and an oil pump to communicate with each other, first and second drain ports provided on the outer circumferential surface of the housing and allowing the flow passage and a lash adjuster to communicate with each other, a spool moved along the flow passage by a solenoid to open and close the main port, a control port, and the first and second drain ports, and a relief valve provided in the flow passage at a section where the control port and the second drain port are connected to each other and allowing pressure on a control port side to be maintained at a predetermined pressure; a main line connecting the main port and the oil pump to each other; a control line connecting the control line and the lash adjuster to each other; an orifice provided between the main line and the control line; and a controller controlling the OCV to allow at least one combination of the main port and the first drain port, the control port and the second drain port, and the main port and the control port to communicate with each other.

The controller may control the OCV in one of a first mode, a second mode, and a third mode, wherein in the first mode, the control port and the second drain port communicate with each other while the main port and the first drain port communicate with each other, in the second mode, the main port and the first drain port are closed while the control port and the second drain port communicate with each other, and in the third mode, the first drain port and the second drain port are closed while the main port and the control port communicate with each other.

Depending on whether a hydraulic control mechanism is operated, the controller may control the OCV in the first mode to adjust oil pressure in the main line, may control the OCV in the second mode to maintain oil pressure in the main line at an increased or maximum pressure, and when the lash adjuster is to be driven, may control the OCV in the third mode.

When the OCV is controlled in the first mode, the controller may control the OCV such that an opening ratio of the first drain port increases as oil pressure in the main line is higher than a reference zone, and the opening ratio of the first drain port decreases as oil pressure in the main line is lower than the reference zone.

When the OCV is controlled in the first mode, the controller may set the reference zone to a first minimum or reduced oil pressure zone when the hydraulic control mechanism is operated, and may set the reference zone to a second reduced oil pressure zone when the hydraulic control mechanism is not operated, the second reduced oil pressure zone being lower than the first reduced oil pressure zone.

The OCV may be configured such that the first drain port, the main port, the control port, and the second drain port are formed on the outer circumferential surface of the housing to be arranged sequentially in a downward direction or a reverse direction, and the spool may be normally located at an initial point allowing the control port and the second drain port to communicate with each other with intervention of the relief valve while allowing the main port and the first drain port to communicate with each other.

The spool may have a first end coupled to an armature that is moved by the solenoid and a second end coupled to a compression spring that provides elasticity to the spool, whereby the spool is normally located at the initial point.

When the OCV is controlled in the first mode, the controller may not drive the solenoid, when the OCV is controlled in the second mode, the controller may drive the solenoid by a first set value such that the spool is moved from the initial point to a first point, and when the OCV is controlled in the third mode, the controller may drive the solenoid by a second set value being greater than the first set value such that the spool is moved from the initial point to a second point.

According to another aspect of the present disclosure, there is provided a control method for a hydraulic variable valve, the control method including: comparing, by a controller, oil pressure in a main line with a reference zone; and as a result of the comparing oil pressure in the main line with the reference zone, controlling, by the controller, an OCV in a first mode such that an opening ratio of a first drain port is maintained when oil pressure in the main line is included in the reference zone, the opening ratio of the first drain port is increased when oil pressure in the main line is lower than the reference zone, and the opening ratio of the first drain port is decreased when oil pressure in the main line is higher than the reference zone.

The control method may further include before the comparing oil pressure in the main line with the reference zone, checking, by the controller, whether a lash adjuster is to be driven, wherein as a result of the checking whether the lash adjuster is to be driven, when the lash adjuster is to be driven, the controller may control the OCV in a third mode.

The control method may further include as a result of the checking whether the lash adjuster is to be driven, when the lash adjuster is not to be driven, determining, by the controller, whether a hydraulic control mechanism is to be operated, wherein as a result of the determining whether the hydraulic control mechanism is to be operated, when the hydraulic control mechanism is to be operated, the controller may set the reference zone to a first reduced oil pressure zone in the comparing oil pressure in the main line with the reference zone, and when the hydraulic control mechanism is not to be operated, the controller may set the reference zone to a second reduced oil pressure zone being lower than the first reduced oil pressure zone.

According to the control system and the control method for the hydraulic variable valve having the above-described configuration, it is possible to control engine oil pressure in accordance with running conditions of a vehicle while realizing the CDA function by using a single OCV. Because of this, it is possible to perform multiple functions at a reduced cost, thereby achieving a reduction in manufacturing cost and in package volume.

Furthermore, due to adjustment of oil pressure, it is possible to reduce the driving torque of the oil pump and the friction between engine components, thereby improving fuel mileage of the engine.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
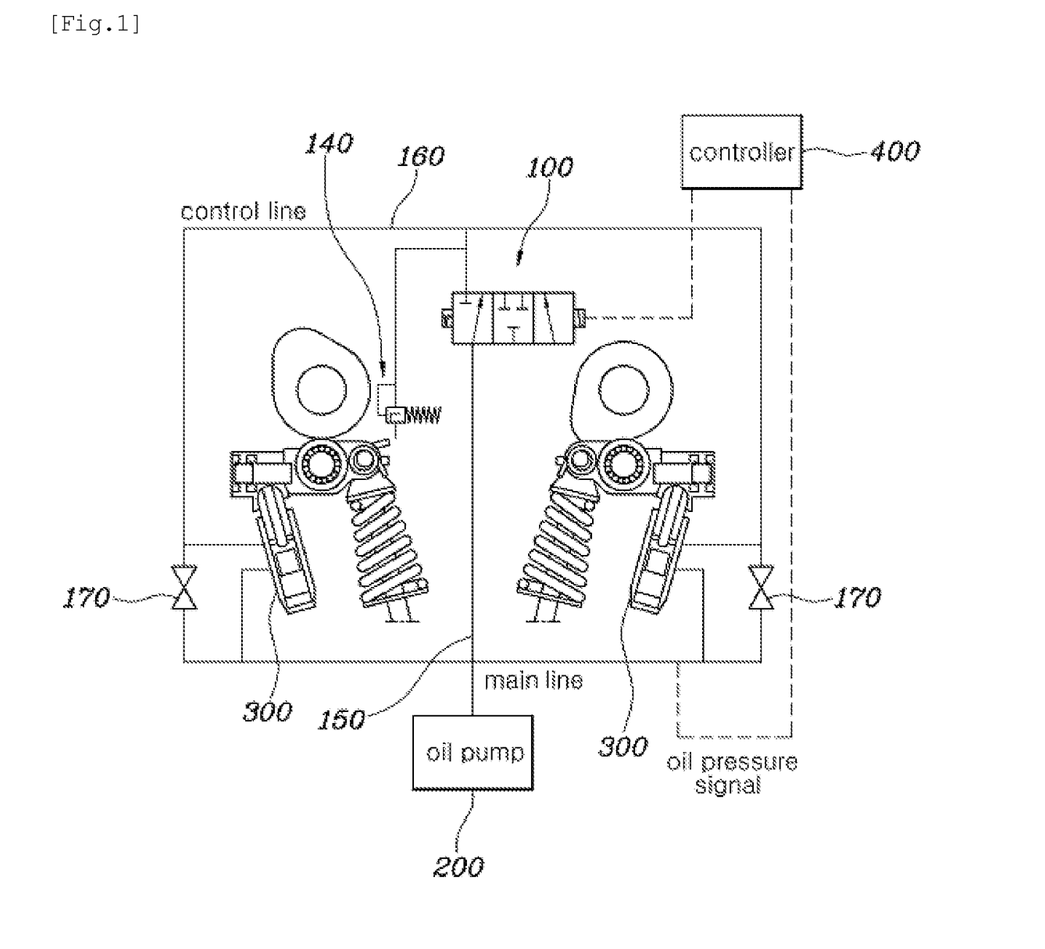
FIG. 1 is a block diagram schematically showing a control system for a hydraulic variable valve according to an aspect of the present disclosure.
Figure 2:
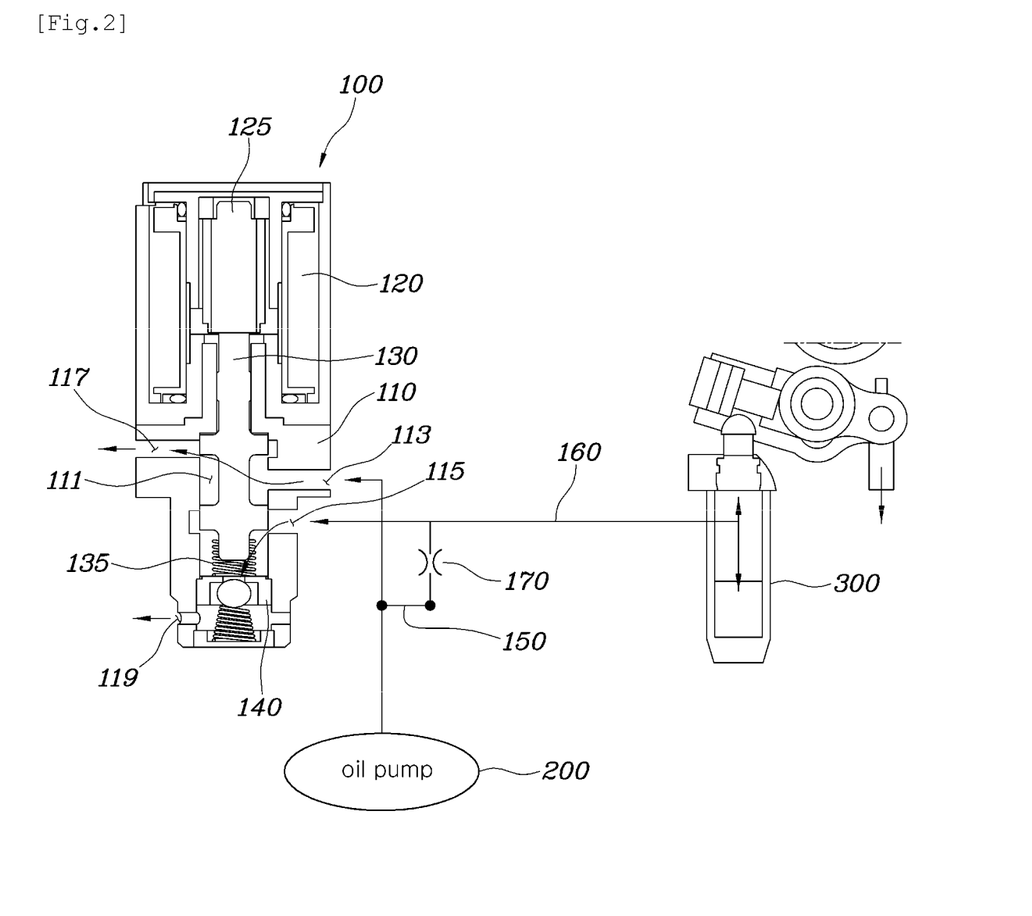
FIGS. 2 to 4 are views showing oil flow and operation according to each control mode of the control system for the hydraulic variable valve according to the present disclosure.
Figure 3:
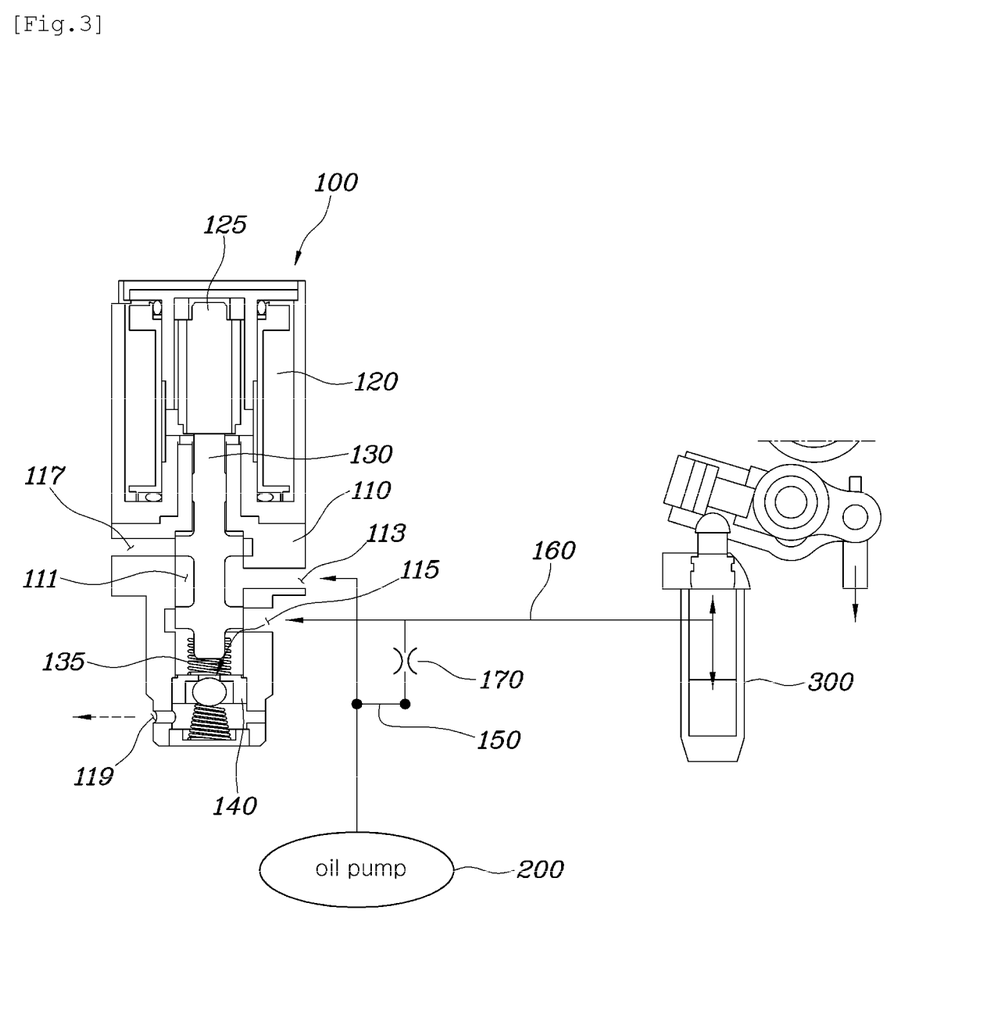
Figure 4:
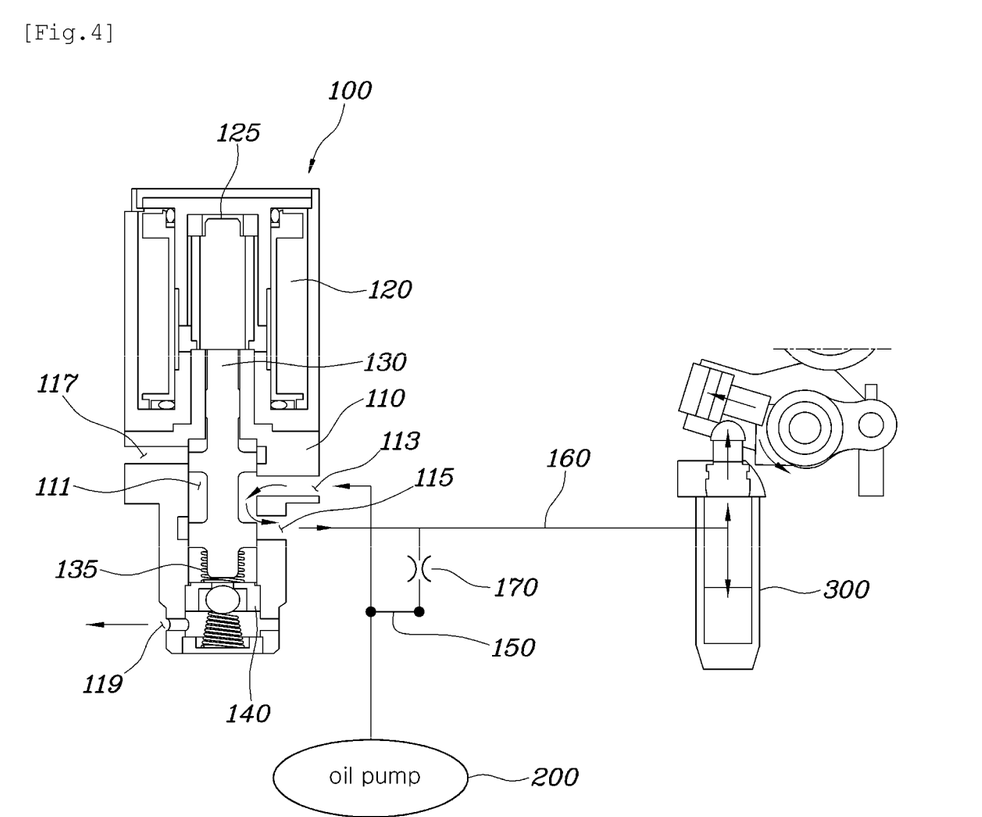

FIG. 1 is a block diagram schematically showing a control system for a hydraulic variable valve according to one form of the present disclosure, and FIGS. 2 to 4 are views showing oil flow and operation according to each control mode of the control system for the hydraulic variable valve according to the present disclosure.

Referring to FIGS. 1 to 4, a control system for a hydraulic variable valve according to the present disclosure may include: an oil control valve (OCV) 100 configured with a housing 110 having a flow passage 111 defined therein, a main port 113 provided on an outer circumferential surface of the housing 110 and allowing the flow passage 111 and an oil pump 200 to communicate with each other, first and second drain ports 117 and 119 provided on the outer circumferential surface of the housing 110 and allowing the flow passage 111 and a lash adjuster 300 to communicate with each other, a spool 130 moved along the flow passage 111 by a solenoid 120 to open and close the main port 113, a control port 115, and the first and second drain ports 117 and 119, and a relief valve 140 provided in the flow passage 111 at a section where the control port 115 and the second drain port 119 are connected to each other and allowing pressure on a control port 115 side to be maintained at a predetermined pressure; a main line 150 connecting the main port 113 and the oil pump 200 to each other; a control line 160 connecting the control port 115 and the lash adjuster 300 to each other; an orifice 170 provided between the main line 150 and the control line 160; and a controller 400 controlling the OCV 100 to allow at least one combination of the main port 113 and the first drain port 117, the control port 115 and the second drain port 119, and the main port 113 and the control port 115 to communicate with each other.

Specifically explained, the controller 400 controls the OCV 100 in one of a first mode, a second mode, and a third mode, wherein in the first mode, the control port 115 and the second drain port 119 communicate with each other while the main port 113 and the first drain port 117 communicate with each other, in the second mode, the main port 113 and the first drain port 117 are closed while the control port 115 and the second drain port 119 communicate with each other, and in the third mode, the first drain port 117 and the second drain port 119 are closed while the main port 113 and the control port 115 communicate with each other.

Though a typical OCV includes three ports, the OCV 100 according to the present disclosure includes four ports. Such a construction may allow for the realization of fuel mileage improvement through control of oil pressure while realizing a cylinder deactivation (CDA) function through operation of the lash adjuster 300.

Herein, the lash adjuster 300 may be configured as a hydraulic lash adjuster (HLA) that operates hydraulically or a mechanical lash adjuster (MLA) that operates mechanically.

Specifically explained, as shown in FIG. 2, the housing 110 of the OCV 100 has the flow passage 111 defined to allow oil to flow therein and four ports, that is, the main port 113, the control port 115, the first drain port 117, and the second drain port 119 each extending from the flow passage 111 to allow oil to flow in and out thereof.

The main port 113 is connected with the oil pump 200 with intervention of the main line 150 to receive oil from the oil pump 200. Alternatively, the main port 113 may be connected with the oil pump 200 with intervention of a cylinder block or a cylinder head, which may be designed to vary depending on a vehicle type or designer's intension.

The control port 115 is connected with the lash adjuster 300 performing the CDA function with intervention of the control line 160, while the control line 160 and the main line 150 are connected with each other with intervention of an orifice 170, enabling the main line 150 and the control line 160 to be maintained at different pressures.

The first and second drain ports 117 and 119 are openings provided to adjust the pressures in the main line 150 and the control line 160, respectively, and serve as paths through which oil present in the flow passage 111 is to be drained outside.

The OCV 100 has the spool 130 provided therein and configured to be movable to selectively open and close four ports. The spool 130 is controlled to be moved together with an armature 125 through an electrical action of the solenoid 120.

The controller 400, as shown in FIG. 1, controls to drive the solenoid 120 of the OCV 100 whereby the ports of the OCV 100 are caused to selectively perform an opening/closing operation. The controller 400 may control the OCV 100 in three control modes.

Specifically explained, depending on whether a hydraulic control mechanism is operated, the controller 400 may control the OCV 100 in the first mode when oil pressure in the main line 150 is to be adjusted, may control the OCV 100 in the second mode when oil pressure in the main line 150 is to be maintained at a maximum or increased pressure, and when the lash adjuster 300 is to be driven, may control the OCV 100 in the third mode.

Herein, the hydraulic control mechanism denotes devices such as a CWT controlled in accordance with an oil hydraulic pressure, and the controller 400 controls the OCV 100 in the first mode to form oil pressure in the main line 150, the oil pressure being controlled by operation of hydraulic control mechanisms.

FIG. 2 shows that the OCV 100 is controlled in the first mode in which the main port 113 and the first drain port 117 communicate with each other, so that the degree of drainage of oil present in the main line 150 to the first drain port 117 is adjusted, thereby adjusting oil pressure in the main line 150. Furthermore, the control port 115 and the second drain port 119 are allowed to communicate with each other and the relief valve 140 is interposed therebetween, so that when the pressure in the control line 160 is equal to or greater than a predetermined pressure, the relief valve 140 is opened to cause oil to be drained to the second drain port 119 to maintain the pressure in the control line 160 at the predetermined pressure.

The relief valve 140 is configured to define a path on the flow passage 111 and to close the path with a spring and a ball. Herein, when the ball is pushed by oil pressure flowing from the control port 115 and thus the spring is compressed, the path is opened to cause the control port 115 and the second drain port 119 to communicate with each other. This makes it possible to maintain the pressure in the control line 160 at a predetermined level.

FIG. 3 shows that the OCV 100 is controlled in the second mode in which the main port 113 and the first drain port 117 are closed while the control port 115 and the second drain port 119 selectively communicate with each other with intervention of the relief valve 140, thereby maintaining oil pressure in the main line 150 at the increased pressure.

FIG. 4 shows that the OCV 100 is controlled in the third mode in which the spool 130 is moved to cause the main port 113 and the control port 115 to communicate with each other, so that the pressure in the control line 160 increases to be equal to the pressure in the main line 150. Herein, since the control line 160 is connected with the lash adjuster 300, the lash adjuster 300 operates to release a latching pin, thereby realizing the CDA function.

Herein, the lash adjuster 300, as shown in FIGS. 2 to 4, may be configured as a single type lash adjuster operable with only the control line 160 connected therewith. Alternatively, the lash adjuster 300 may be configured as a dual type lash adjuster operable with both the main line 150 and the control line 160 connected therewith such that operation is performed due to a pressure difference between the main line 150 and the control line 160.

When the OCV 100 is controlled in the first mode, the controller 400 may control the OCV 100 such that an opening ratio of the first drain port 117 increases as oil pressure in the main line 150 is higher than a reference zone, and the opening ratio of the first drain port 117 decreases as oil pressure in the main line 150 is lower than the reference zone.

In other words, the opening ratio of the first drain port 117 is adjusted in a state where the OCV 100 is controlled in the first mode, resulting in the oil pressure in the main line 150 being varied. Because of this, it is possible to realize oil pressure desired by the hydraulic control mechanism.

If the OCV 100 is controlled such that the opening ratio of the first drain port 117 increases, the amount of oil drained from the main port 113 to the first drain port 117 increases, thereby decreasing oil pressure. Conversely, if the OCV 100 is controlled such that the opening ratio of the first drain port 117 decreases, the amount of oil drained from the main port 113 to the first drain port 117 decreases, thereby increasing oil pressure.

If oil pressure in the main line 150 is included in the reference zone, the opening ratio of the first drain port 117 may be fixed to thereby form oil pressure as desired by the hydraulic control mechanism. As described above, when oil pressure in the main line 150 is controlled to be decreased, a driving torque for the oil pump 200 is caused to be decreased, resulting in an improvement of fuel mileage of an engine.

Additionally, when the OCV 100 is controlled in the first mode, the hydraulic control mechanism is operated and the controller 400 may set the reference zone to a first minimum, or reduced, oil pressure zone. When the hydraulic control mechanism is not operated, the controller 400 may set the reference zone to a second minimum, or reduced oil pressure zone, the second reduced oil pressure zone being lower than the first reduced oil pressure zone.

In other words, the controller 400 controls the OCV 100 in the first mode such that oil pressure is included in the first reduced oil pressure zone which is a reduced pressure satisfying operating conditions of the hydraulic control mechanism. Because of this, it is possible to enable oil pressure in the main line 150 to be maintained at a reduced level to decrease the driving torque for the oil pump 200, thereby achieving a significant reduction in fuel mileage of the engine.

Conversely, when operation of the hydraulic control mechanism is not employed, the controller 400 controls the OCV 100 in the first mode such that oil pressure in the main line 150 is included in the second reduced oil pressure zone being lower than the first reduced oil pressure zone, thereby reducing oil pressure in the main line 150.

Herein, the second reduced oil pressure zone is set to an oil pressure zone to such a degree that the OCV 100 functions well and durably, and may be derived through a number of experiments.

Figure 5:
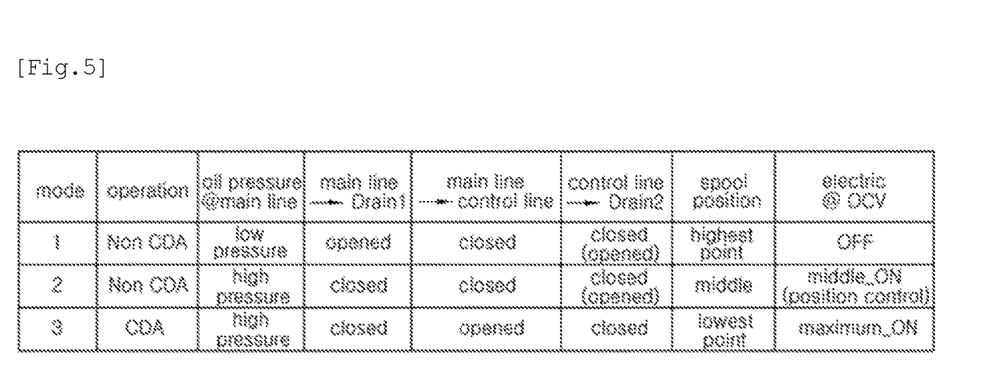
FIG. 5 is a table showing an operation table of the control system for the hydraulic variable valve according to an aspect of the present disclosure.

FIG. 5 is a table showing an operation table of the control system for the hydraulic variable valve according to one form of the present disclosure.

Referring to FIG. 5, the third mode of the OCV is executed only when the CDA function is activated. On the other hand, when the CDA function is not activated, the first and second modes are selectively performed such that depending on whether the hydraulic control mechanisms are operated, the controller controls the OCV in the second mode when desiring oil pressure to be maintained at the increased pressure, and controls the OCV in the first mode when desiring oil pressure to be varied. Herein, a spool position and the level of driving current will be described later.

The OCV 100 is configured such that the first drain port 117, the main port 113, the control port 115, and the second drain port 119 are formed on the outer circumferential surface of the housing 110 to be arranged sequentially in a downward direction or a reverse direction. The spool 130 may be normally located at an initial point allowing the control port 115 and the second drain port 119 to communicate with each other with intervention of the relief valve 140 while allowing the main port 113 and the first drain port 117 to communicate with each other.

Specifically explained, the spool 130 may have a first end coupled to the armature 125 that is moved by the solenoid 120 and a second end coupled to a compression spring 135 that provides elasticity to the spool, whereby the spool 130 is normally located at the initial point.

In other words, when the spool 130 is not moved by the solenoid 120, as shown in FIG. 2, the spool 130 is in close contact with an upper or lower end of the flow passage 111 defined in the housing 110 due to elasticity of the compression spring 130 acting thereon. Herein, the spool 130 is in a state of realizing the first mode of the OCV 100.

In one aspect, the initial point of the spool 130 may be determined as a position when oil pressure maximally decreases by maximally increasing the opening ratio of the first drain port 117. When the spool 130 is moved and thus distanced away from the initial point by the armature 125 upon operation of the solenoid 120, the opening ratio of the first drain port 117 decreases thereby.

When the OCV 100 is controlled in the first mode, the controller 400 may not drive the solenoid 120. When the OCV 100 is controlled in the second mode, the controller 400 may drive the solenoid 120 by a first set value such that the spool 130 is moved from the initial point to a first point. When the OCV 100 is controlled in the third mode, the controller 400 may drive the solenoid 120 by a second set value being greater than the first set value such that the spool 130 is moved from the initial point to a second point.

In other words, in the present disclosure, the OCV 100 is initially in the first mode when the controller 400 does not apply a driving current to the solenoid 120. The spool 130 is moved as the driving current of the solenoid gradually increases and thus decreases the opening ratio of the first drain port 117. When the solenoid 120 is driven by the first set value, the first drain port 117 is completely closed and the second mode is entered. Increasing further the driving current of the solenoid decreases the opening ratio of the second drain port 119. When the driving current reaches the second set value, the main port 113 and the control port 115 are allowed to communicate with each other and the third mode is entered.

As described above, the controller 400 controls the OCV 100 in the order of the first, second, and third modes by gradually increasing the driving current.

Hereinafter, a controlling method for a hydraulic variable valve according to an aspect of the present disclosure will be described with reference to the accompanying drawings.

Figure 6:
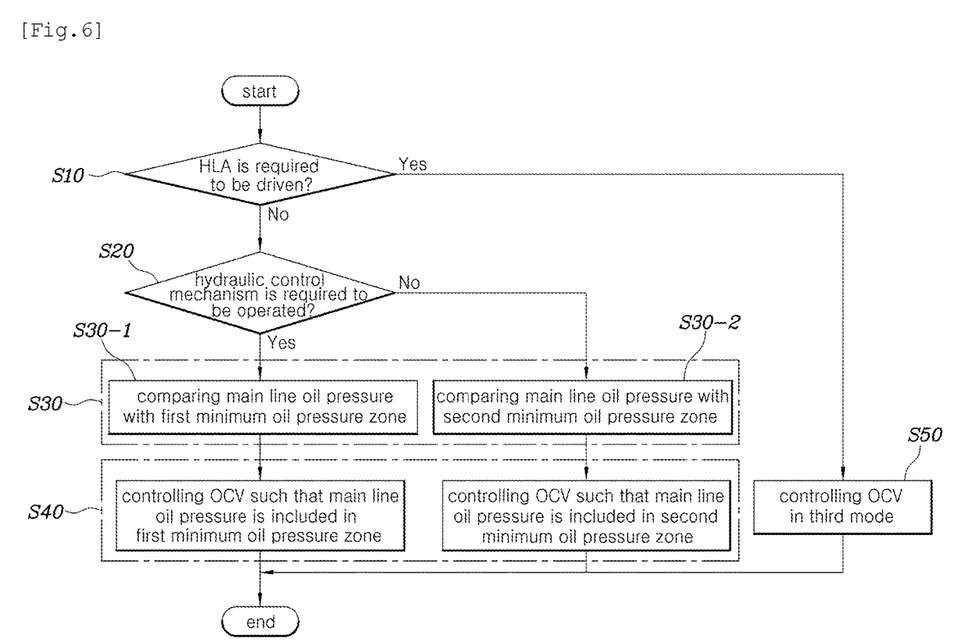
FIG. 6 is a flowchart showing a control method for a hydraulic variable valve according to an aspect of the present disclosure.

FIG. 6 is a flowchart showing a control method for a hydraulic variable valve according to an aspect of the present disclosure. Referring to FIG. 6, the controlling method for the hydraulic variable valve according to the present disclosure may include: comparing, by a controller, oil pressure in a main line with a reference zone (S30); and as a result of the comparing oil pressure in the main line with the reference zone (S30), controlling, by the controller, an OCV in a first mode such that an opening ratio of a first drain port is maintained when oil pressure in the main line is included in the reference zone, the opening ratio of the first drain port is increased when oil pressure in the main line is lower than the reference zone, and the opening ratio of the first drain port is decreased when oil pressure in the main line is higher than the reference zone (S40).

In addition, the controlling method for the hydraulic variable valve may further include: before the comparing oil pressure in the main line with the reference zone (S30), checking, by the controller, whether a lash adjuster is to be driven (S10), wherein as a result of the checking whether the lash adjuster is to be driven (S10), when the lash adjuster is to be driven, the controller controls the OCV in a third mode (S50).

The controlling method for the hydraulic variable valve may further include: as a result of the checking whether the lash adjuster is to be driven (S10), when the lash adjuster is not to be driven, determining, by the controller, whether a hydraulic control mechanism is to be operated (S20), wherein as a result of the determining whether the hydraulic control mechanism is to be operated (S20), when the hydraulic control mechanism is to be operated, the controller sets the reference zone to a first reduced oil pressure zone in the comparing oil pressure in the main line with the reference zone (S30-1), and when the hydraulic control mechanism is not to be operated, the controller sets the reference zone to a second reduced oil pressure zone being lower than the first reduced oil pressure zone (S30-2).

According to the control system and the control method for the hydraulic variable valve having the above-described configuration, it is possible to control engine oil pressure in accordance with a vehicle while realizing the CDA function using a single OCV. Because of this, it is possible to perform multiple functions at a reduced cost, thereby achieving a reduction in manufacturing cost and in package volume.

Furthermore, due to adjustment of oil pressure, it is possible to reduce the driving torque of the oil pump and the friction between engine components, thereby improving fuel mileage of the engine.

Although aspects of the present disclosure have been described for illustrative purposes, those skilled in the art will appreciate that various modifications, additions and substitutions are possible, without departing from the scope and spirit of the invention as disclosed in the accompanying claims.

What is claimed is:

1. A control system for a hydraulic variable valve, the control system comprising:
   an oil control valve (OCV) configured with a housing having a flow passage defined therein, a main port provided on an outer circumferential surface of the housing and allowing the flow passage and an oil pump to communicate with each other, first and second drain ports provided on the outer circumferential surface of the housing and allowing the flow passage and a lash adjuster to communicate with each other, a spool moved along the flow passage by a solenoid to open and close the main port, a control port, and the first and second drain ports, and a relief valve provided in the flow passage at a section where the control port and the second drain port are connected to each other and allowing pressure on a control port side to be maintained at a predetermined pressure;
   a main line connecting the main port and the oil pump to each other;
   a control line connecting the control port and the lash adjuster to each other;
   an orifice provided between the main line and the control line; and
   a controller controlling the OCV to allow at least one combination of the main port and the first drain port, the control port and the second drain port, and the main port and the control port to communicate with each other.

2. The control system of claim 1, wherein the controller controls the OCV in one of a first mode, a second mode, and a third mode, wherein
   in the first mode, the control port and the second drain port communicate with each other while the main port and the first drain port communicate with each other,
   in the second mode, the main port and the first drain port are closed while the control port and the second drain port communicate with each other, and
   in the third mode, the first drain port and the second drain port are closed while the main port and the control port communicate with each other.

3. The control system of claim 2, wherein depending on whether a hydraulic control mechanism is operated, the controller controls the OCV in the first mode to adjust oil pressure in the main line, controls the OCV in the second mode to maintain oil pressure in the main line at an increased pressure, and when the lash adjuster is to be driven, controls the OCV in the third mode.

4. The control system of claim 3, wherein when the OCV is controlled in the first mode, the controller controls the OCV such that an opening ratio of the first drain port increases as oil pressure in the main line is higher than a predetermined reference pressure range for determining when the hydraulic control mechanism is operated or not operated, and the opening ratio of the first drain port decreases as oil pressure in the main line is lower than the predetermined reference pressure range.

5. The control system of claim 4, wherein when the OCV is controlled in the first mode, the controller sets the predetermined reference pressure range to a first reduced oil pressure range when the hydraulic control mechanism is operated, and sets the predetermined reference pressure range to a second reduced oil pressure range when the hydraulic control mechanism is not operated, the second reduced oil pressure range being lower than the first reduced oil pressure range.

6. The control system of claim 2, wherein the OCV is configured such that the first drain port, the main port, the control port, and the second drain port are formed on the outer circumferential surface of the housing to be arranged sequentially in a longitudinal direction of the OCV, and
   the spool is normally located at an initial point allowing the control port and the second drain port to communicate with each other with intervention of the relief valve while allowing the main port and the first drain port to communicate with each other.

7. The control system of claim 6, wherein the spool has a first end coupled to an armature that is moved by the solenoid and a second end coupled to a compression spring that provides elasticity to the spool, whereby the spool is normally located at the initial point.

8. The control system of claim 6, wherein when the OCV is controlled in the first mode, the controller does not drive the solenoid, when the OCV is controlled in the second mode, the controller drives the solenoid by a first set value such that the spool is moved from the initial point to a first point, and when the OCV is controlled in the third mode, the controller drives the solenoid by a second set value being greater than the first set value such that the spool is moved from the initial point to a second point.

9. A control method for a hydraulic variable valve control system, where the hydraulic variable valve control system comprises: an oil control valve (OCV) configured with a housing having a flow passage defined therein, a main port provided on an outer circumferential surface of the housing and allowing the flow passage and an oil pump to communicate with each other, first and second drain ports provided on the outer circumferential surface of the housing and allowing the flow passage and a lash adjuster to communicate with each other, a spool moved along the flow passage by a solenoid to open and close the main port, a control port, and the first and second drain ports, and a relief valve provided in the flow passage at a section where the control port and the second drain port are connected to each other and allowing pressure on a control port side to be maintained at a predetermined pressure; a main line connecting the main port and the oil pump to each other; a control line connecting the control port and the lash adjuster to each other; an orifice provided between the main line and the control line; and a controller controlling the OCV to allow at least one combination of the main port and the first drain port, the control port and the second drain port, and the main port and the control port to communicate with each other, the control method comprising:

comparing, by the controller, oil pressure in the main line with a predetermined reference pressure range for determining when a hydraulic control mechanism is operated or not operated; and as a result of the comparing oil pressure in the main line with the predetermined reference pressure range, controlling, by the controller, the OCV in a first mode such that an opening ratio of the first drain port is maintained when oil pressure in the main line is included in the predetermined reference pressure range, the opening ratio of the first drain port is increased when oil pressure in the main line is lower than the predetermined reference pressure range, and the opening ratio of the first drain port is decreased when oil pressure in the main line is higher than the predetermined reference pressure range.

10. The control method of claim 9, further comprising:
before the comparing oil pressure in the main line with the predetermined reference pressure range, checking, by the controller, whether the lash adjuster is to be driven,
wherein as a result of the checking whether the lash adjuster is to be driven, when the lash adjuster is to be driven, the controller controls the OCV in a third mode.

11. The control method of claim 10, further comprising:
as a result of the checking whether the lash adjuster is to be driven, when the lash adjuster is not to be driven, determining, by the controller, whether a hydraulic control mechanism is to be operated, wherein as a result of the determining whether the hydraulic control mechanism is to be operated, when the hydraulic control mechanism is to be operated, the controller sets the predetermined reference pressure range to a first reduced oil pressure range which is a reduced pressure range satisfying operating conditions of the hydraulic control mechanism in the comparing oil pressure in the main line with the predetermined reference pressure range, and when the hydraulic control mechanism is not to be operated, the controller sets the predetermined reference pressure range to a second reduced oil pressure range being lower than the first reduced oil pressure range.

12. A control system for a hydraulic variable valve, the control system comprising:

an oil control valve (OCV) configured with a housing having a flow passage defined therein, a main port provided on an outer circumferential surface of the housing and allowing the flow passage and an oil pump to communicate with each other, first and second drain ports provided on the outer circumferential surface of the housing and allowing the flow passage and a lash adjuster to communicate with each other, a spool moved along the flow passage by a solenoid to open and close the main port, a control port, and the first and second drain ports, and a relief valve provided in the flow passage at a section where the control port and the second drain port are connected to each other and allowing pressure on a control port side to be maintained at a predetermined pressure;

a main line connecting the main port and the oil pump to each other;

a control line connecting the control port and the lash adjuster to each other; and an orifice provided between the main line and the control line;

wherein the OCV is operable in at least a first mode, a second mode, and a third mode;

wherein the control port and the second drain port communicate with each other while the main port and the first drain port communicate with each other in the first mode;

wherein the main port and the first drain port are closed while the control port and the second drain port communicate with each other in the second mode; and wherein the first drain port and the second drain port are closed while the main port and the control port communicate with each other in the third mode.

13. The control system of claim 12, wherein depending on whether a hydraulic control mechanism is operated, in the first mode, oil pressure is adjusted in the main line; in the second mode, oil pressure in the main line is maintained at an increased pressure; and in the third mode, the lash adjuster is driven.

14. The control system of claim 13, wherein in the first mode, an opening ratio of the first drain port increases as oil pressure in the main line is higher than a predetermined reference pressure range for determining when the hydraulic control mechanism is operated or not operated, and the opening ratio of the first drain port decreases as oil pressure in the main line is lower than the predetermined reference pressure range.

15. The control system of claim 14, wherein the predetermined reference pressure range to a first reduced oil pressure range is set when the hydraulic control mechanism is operated, and the predetermined reference pressure range to a second reduced oil pressure range is set when the hydraulic control mechanism is not operated, the second reduced oil pressure range being lower than the first reduced oil pressure range.

16. The control system of claim 12, wherein the first drain port, the main port, the control port, and the second drain port are formed on the outer circumferential surface of the housing to be arranged sequentially in a longitudinal direction of the OCV, and the spool is normally located at an initial point allowing the control port and the second drain port to communicate with each other with intervention of the relief valve while allowing the main port and the first drain port to communicate with each other.

17. The control system of claim 16, wherein the spool has a first end coupled to an armature that is moved by the solenoid and a second end coupled to a compression spring that provides elasticity to the spool, whereby the spool is normally located at the initial point.

18. The control system of claim 16, wherein in the first mode, the solenoid is not driven, and in the second mode, the solenoid is driven by a first set value such that the spool is moved from the initial point to a first point, and in the third mode, the solenoid is driven by a second set value greater than the first set value such that the spool is moved from the initial point to a second point.

\* \* \* \* \*